United States Patent
Holl, II (10) Patent No.: US 8,108,640 B1
(45) Date of Patent: Jan. 31, 2012

(54) RESERVING A THIN PROVISIONED SPACE IN A STORAGE SYSTEM

(75) Inventor: James Hartwell Holl, II, Los Gatos, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 462 days.

(21) Appl. No.: 12/425,300

(22) Filed: Apr. 16, 2009

(51) Int. Cl.
*G06F 13/00* (2006.01)

(52) U.S. Cl. ........ 711/162; 711/171; 711/173; 711/172; 711/163

(58) Field of Classification Search ............. 711/162, 711/173, 171, 172, 163
See application file for complete search history.

(56) References Cited

U.S. PATENT DOCUMENTS

| | | | |
|---|---|---|---|
| 7,111,136 B2 * | 9/2006 | Yamagami | 711/162 |
| 7,454,583 B2 * | 11/2008 | Yagisawa et al. | 711/162 |
| 7,603,529 B1 * | 10/2009 | MacHardy et al. | 711/162 |

* cited by examiner

*Primary Examiner* — Vu Le
*Assistant Examiner* — Han Yang
(74) *Attorney, Agent, or Firm* — Blakely, Sokoloff, Taylor & Zafman LLP (57) ABSTRACT

A storage system includes a storage space provisioning system coupled to a primary storage server and a secondary storage server to resize a thin provisioned secondary volume on the secondary storage server. The storage space provisioning system detects data stored on a primary volume that is to be transferred to a secondary volume and obtains a point-in-time copy of the data stored on the primary volume. The storage provisioner determines a maximum transfer size of the data to be transferred using the point-in-time copy, and compares the maximum transfer size to a difference between the thin provisioned size of the secondary volume and a used size of the secondary volume. The storage space provisioning system increases the thin provisioned size of the secondary volume to be greater than the used size of the secondary volume plus the maximum transfer size when the maximum transfer size is greater than the difference.

21 Claims, 6 Drawing Sheets

RESERVING A THIN PROVISIONED SPACE IN A STORAGE SYSTEM

FIELD OF THE INVENTION

This invention relates generally to reserving a thin provisioned space in a storage system, and more particularly to resizing a secondary volume on a secondary storage server.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2008, NetApp, Inc., All Rights Reserved.

BACKGROUND OF THE INVENTION

As the capacity of storage devices increases and as I/O operations get faster, the ability to manage data storage operations in line with data transfers is getting weaker. Historically, when data was transferred (e.g., during a backup operation) from a primary storage server to a secondary storage server, administrators determined the size of a secondary volume on the secondary storage server to handle the transfer by predicting or estimating the rate of change of the data. For example, an administrator may have estimated that it was extremely unlikely that 20% of the data would have changed between backup operations. Therefore, an administrator would set the size of the secondary volume on the secondary storage server to be 20% larger than the primary volume on the primary storage server. The danger in making such estimations lies where the estimations are wrong, resulting in failed backup operations. Estimating the size of the secondary volume can have provided a solution in environments having a small amount of data to manage, but such a solution is insufficient for managing large amounts of data (e.g., the data of an enterprise).

One attempt at managing large amounts of data and data storage operations was to not try to predict the rate of change of the data, but to actually adjust the size of the secondary volume in line with the write operations of the data transfer. However, the size of the secondary volume could not grow on demand in the middle of a data transfer because the ability to resize the secondary volume could not keep up with the write operations. Another attempt at managing large amounts of data and data storage operations involved thin provisioning every secondary volume to the largest possible size. Those skilled in the art will appreciate that thin provisioning is a way of presenting more storage space to the hosts or servers connecting to the storage system than is actually physically available. This solution proved successful in environments where there were a small number of thin provisioned secondary volumes (e.g., 10, 12, 14 thin provisioned secondary volumes). However, many storage system background processes scaled linearly with the thin provisioned size of the secondary volumes. Consequently, in storage systems that pushed the limits of the storage system (e.g., environments having 500 thin provisioned secondary volumes), thin provisioning a great number of volumes to the largest possible size proved disastrous. For example, thin provisioning 500 secondary volumes to be the size of an entire pool of storage translated into a 500× increase in time taken by certain storage system background processes.

One way to provision the necessary size of the secondary volume is to determine the size of the data that is to be transferred. However, transfer engines typically do not determine the amount of data to be transferred until the transfer is actually complete. In addition, traversing an active file system to determine the size of the data to be transferred can be an expensive and intensive operation that can significantly impact the load on a storage system's CPU.

SUMMARY OF THE INVENTION

A storage system includes a storage space provisioning system coupled to a primary storage server and a secondary storage server to resize a thin provisioned secondary volume on the secondary storage server before the primary storage server transfers data to the secondary storage server. The storage space provisioning system detects data stored on a primary volume on the primary storage server that is to be transferred to a secondary volume on the secondary storage server and obtains a point-in-time copy of the data to be transferred. The storage space provisioning system determines a maximum transfer size of the data to be transferred using the point-in-time copy and compares the maximum transfer size to a difference between the thin provisioned size of the secondary volume and a used size of the secondary volume. The storage space provisioning system increases the thin provisioned size of the secondary volume to be greater than the used size of the secondary volume plus the maximum transfer size when the maximum transfer size is greater than the difference and initiates the data transfer.

The present invention is described in conjunction with systems, clients, servers, methods, and computer-readable media of varying scope. In addition to the aspects of the present invention described in this summary, further aspects of the invention will become apparent by reference to the drawings and by reading the detailed description that follows.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention.

The following detailed description is, therefore, not to be taken in a limiting sense, and the scope of the present invention is defined only by the appended claims.

Rapid growth of data storage requirements coupled with relatively static information technology staffing levels is leading toward replacing manual provisioning processes with automated provisioning processes. The provisioning architecture of the present invention can provide storage administrators the ability to automatically manage some of their secondary storage provisioning without causing significant impact on a storage system's CPU load or adversely affecting space utilization.

Figure 1:
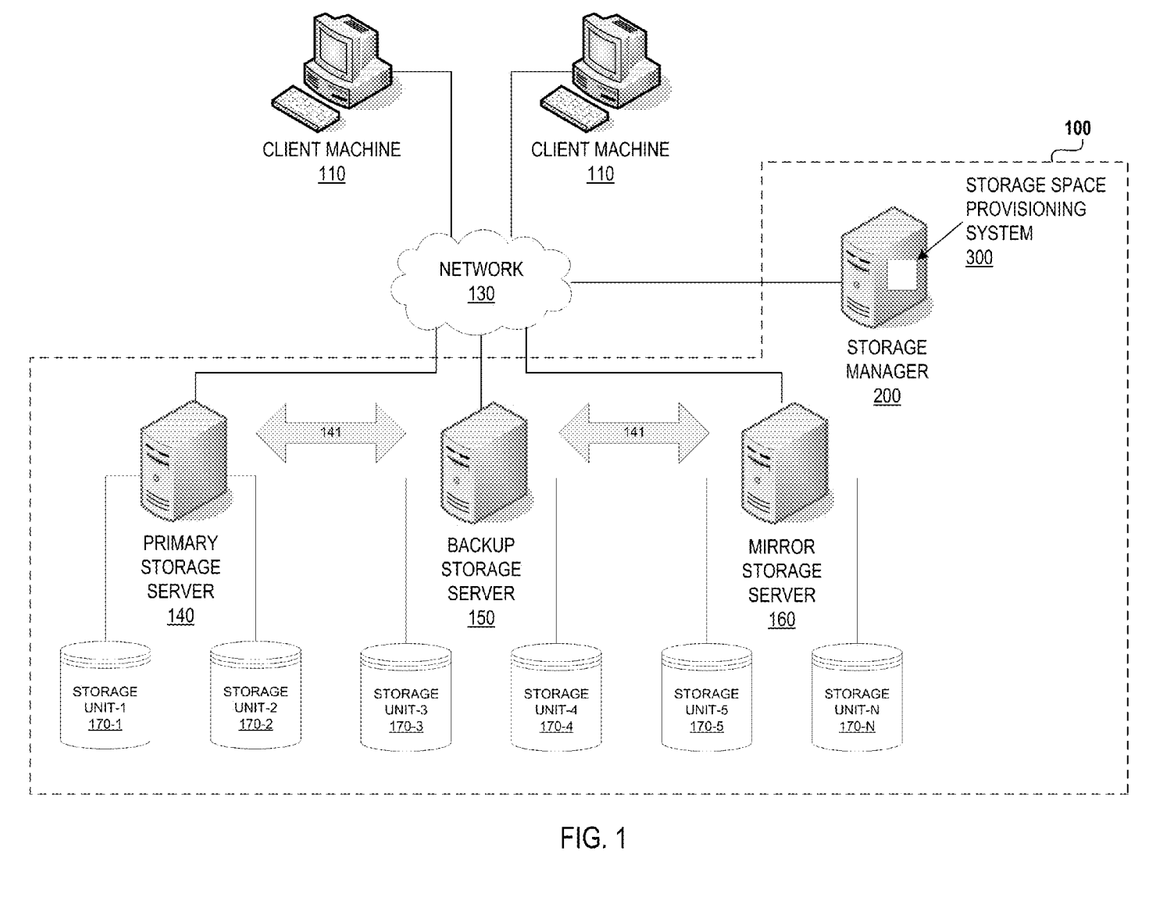
FIG. 1 illustrates an embodiment of a networked storage system.

FIG. 1 shows a network storage system 100 according to some embodiments of the present invention. The network storage system 100 includes client machines 110, a storage manager 200, a primary storage server 140, a backup storage server 150, and a mirror storage server 160. Storage servers 140, 150 and 160 manage multiple storage units 170 (170-1 to 170-N) that include mass storage devices (not shown). These storage servers can provide data storage services to one or more clients 110 through a network 130. Network 130 may be, for example, a local area network (LAN), wide area network (WAN), metropolitan area network (MAN), global area network such as the Internet, a Fibre Channel fabric, or any combination of such interconnects. Moreover, the network connections can be wireline, wireless, or a combination of both. As such, the above components may or may not be located at different geographical locations. Each of the clients 110 may be, for example, a conventional personal computer (PC), server-class computer, workstation, handheld computing or communication device, or other special or general purpose computer. Note that any or all of the components of system 100 and associated hardware can be used in various embodiments of the present invention. However, it can be appreciated that other configurations of the networked data storage system can include more or fewer devices than those discussed above.

Storage of data in storage units 170 (170-1 to 170-N) is managed by storage servers 140, 150 and 160. Storage servers 140, 150 and 160 receive and respond to various read and write requests from clients 110 and storage manager 200, directed to data stored in or to be stored in storage units 170. Storage units 170 are comprised of mass storage devices which can include, for example, flash memory, magnetic or optical disks, or tape drives. The storage devices in storage units 170 can further be organized as a Redundant Array of Inexpensive Disks/Devices (RAID), whereby the storage servers 140, 150 and 160 access the storage units 170 using one or more RAID protocols known in the art.

It will be appreciated that certain embodiments of the present invention may be implemented with solid-state memories including flash storage devices constituting storage array (e.g., storage server 140, 150 or 160). For example, a storage server (e.g., storage server 140, 150 or 160) may be operative with non-volatile, solid-state NAND flash devices which are block-oriented devices having good (random) read performance, i.e., read operations to flash devices are substantially faster than write operations. Data stored on a flash device are accessed (e.g., via read and write operations) in units of pages, which in the present embodiment are 4 kB in size, although other page sizes (e.g., 2 kB) may also be used.

When the flash storage devices are organized as one or more parity groups in a RAID array, the data is stored as stripes of blocks within the parity groups, wherein a stripe may constitute similarly located flash pages across the flash devices. For example, a stripe may span a first page 0 on flash device 0, a second page 0 on flash device 1, etc. across the entire parity group with parity being distributed among the pages of the devices. Note that other RAID group arrangements are possible, such as providing a RAID scheme wherein every predetermined (e.g., 8th) block in a file is a parity block.

Storage server 140, 150 or 160 can be a file-level service such as used in a network-attached storage (NAS) environment, a block-level service such as used in a storage area network (SAN) environment, or a service which is capable of providing both file-level and block-level service. Although storage servers 140, 150 and 160 are illustrated as single units in FIG. 1, a storage server can, in other embodiments, be comprised of a physically separate network module (an "N-Module" not shown) and disk module (a "D-Module" not shown). In one embodiment, the D-Module (not shown) includes data processing and storage access components. In contrast, the N-Module (not shown) includes functionality that enables a client access to storage access components (e.g. the D-Module) and includes protocol components, such as Common Internet File System (CIFS), Network File System (NFS), or an Internet Protocol (IP) module, for facilitating such connectivity. It should be noted that there may be different numbers of N- and D-Modules constituting a storage server in accordance with various aspects of the present invention. For example, there may be a number of N-Modules and D-Modules that do not reflect a one-to-one correspondence between the N- and D-Modules for a storage server. As such, the description of a storage server comprising one N-Module and one D-Module should be taken as illustrative only.

A network storage system 100 can include a number of storage servers. In certain embodiments, storage servers 140, 150 and 160 are referred to as network storage subsystems. A network storage subsystem provides networked storage services for a specific application or purpose. Examples of such applications include database applications, web applications, Enterprise Resource Planning (ERP) applications, etc. Examples of such purposes include file archiving, backup, mirroring, etc. A network storage subsystem can also be implemented with a collection of networked resources provided across multiple storage servers and/or storage units.

It should be noted that there may be a number of data replication relationships between storage servers in accordance with various embodiments of the present invention. For example, storage unit 170-1 may represent one storage object from a dataset A (not shown) that is backed up onto storage unit 170-3 in backup storage server 150. In addition, storage unit 170-3 may represent one storage object from a dataset A that is mirrored onto another storage object from dataset A in storage unit-5 in mirror storage server 160. Further, storage unit 170-2 may be a storage object from a dataset B (not shown) that is backed up onto another storage object from dataset B in storage unit-4 in backup storage server 150. Moreover, storage unit 170-4 may represent one storage object from a dataset B that is mirrored onto another storage object from dataset B in minor storage server 160. As such, the description of a single data replication relationship between storage servers 140, 150 and 160 should be taken as illustrative only.

During normal operations, one storage server (e.g. primary storage server 140) functions as a primary provider of data to a client (e.g. client 110). A second storage server (e.g. backup storage server 150) takes on a standby role in the data redundancy setup, replicating data in the primary storage server 140 as, for example, a backup storage server, but not servicing client requests intended for disks accessible via the primary storage server. A third storage server (e.g., mirror storage server 160) can mirror the data of the backup storage server 150. In another embodiment, the third storage server 160 can mirror the data of the primary storage server 140. In disaster recovery, client requests intended for the primary storage server 140 can then be serviced using data in the secondary storage server (e.g., backup storage server 150) if the secondary storage server stores a backup. This hand-off occurs in a "failover" operation, wherein client requests are redirected from the primary storage server 140 to the secondary storage server (e.g., backup storage server 150). In one embodiment, storage manager 200 controls and causes the failover operation. In other embodiments, the primary and secondary storage servers themselves coordinate the failover. Thus, even in the event of a disaster, a client 110 may continue to access its data.

For example, primary storage server 140 manages storage units (e.g., storage unit-1 (170-1) and storage unit-2 (170-2)). Storage unit-1 and storage unit-2 may be physical disks. The client machines 110 can store and access data in storage unit-1 and storage unit-2. The primary storage server 140 can protect the data in storage unit-1 and storage unit-2 by backing up the data to the backup storage server 150 in storage unit-3 (170-3) and storage unit-4 (170-4). In addition, the backup storage server 150 can further mirror storage unit-3 and storage unit-4 onto the storage unit-5 (170-5) and storage unit-N (170-N) managed by the mirror storage server 160. In some embodiments, the client machine 110 stores data in an internal storage device (not shown) such as a disk and backs up the internal disk to another storage device such as storage unit-3 and storage unit-4 managed by the backup storage server 150. It should be noted that "data transfer" will be used to describe data being backed up from one storage server (e.g., primary storage server 140) to another storage server (e.g., backup storage server 150) and data being mirrored from one storage server (e.g., backup storage server 150) to another storage server (e.g., mirror storage server 160). It should also be noted that the term "primary storage server" will be used to describe a storage server storing data that is to be transferred (e.g., data to be backed up to a secondary storage server or data to be mirrored to a secondary storage server). The term "secondary storage server" will be used to describe a storage server storing the data transferred from the primary storage sever. Therefore, when data is transferred (e.g., backed up) from the primary storage server 140 to the backup storage server 150, the primary storage server 140 can be referred to as a primary storage server and the backup storage server 150 can be referred to as a secondary storage server. Likewise, when data is transferred (e.g., mirrored) from the backup storage server 150 to the mirror storage server 160, the backup storage server 150 can be referred to as a primary storage server and the mirror storage server 160 can be referred to as a secondary storage server.

Storage manager 200 is operative to communicate instructions via network 130 to storage servers 140, 150 and 160 regarding what data to replicate, how to replicate data (backup vs. mirror), where to replicate data, when to replicate, etc. The replication relationship between storage servers 140, 150 and 160 is managed by storage manager 200 and is indicated by data replication relationship 141. The storage manager 200 can be implemented as a server, client machine, personal computer (PC), special-purpose computing machine, etc.

The storage manager 200 can initiate data to be transferred (e.g., backed up) from the primary storage server 140 to the backup storage server 150 by sending instructions (e.g., a backup request) to the secondary storage server 150. When storage manager 200 sends a request to backup a volume on the primary storage server 140, the primary storage server 140 generates a backup image that includes all of the point-in-time copies ("snapshots") of a volume. A snapshot will be described in greater detail in connection with FIGS. 5A-5B and FIG. 6.

In one embodiment, storage manager 200 implements a storage space provisioning system 300 in network storage system 100 for provisioning space on a secondary storage server (e.g., backup storage server 150). In another embodiment, the storage provisioning system 300 can be implemented on a storage server (e.g., backup storage server 150). Details of one embodiment of a machine usage to implement the storage provisioning system 300 are shown in FIG. 2.

The storage space provisioning system 300 monitors data transfers (e.g., data being backed up from primary storage server 140 to backup storage server 150) to ensure that the backup storage server 150 has the available storage capacity to store the data before the data is transferred (e.g., backed up). The storage manager 200 can also initiate data transfers from the backup storage server 150 to the mirror storage server 160. The storage space provisioning system 300 can monitor the data transfers to ensure that the mirror storage server 160 has the available storage capacity to store the data before the data is transferred.

One should appreciate that as the numbers of storage servers and storage devices grow in the networked data storage system 100, the workload of data management as well as the complexity of data management increases. Thus, it becomes more difficult for an administrator to manually manage data in the system 100. In order to improve efficiency and to reduce the risk of making errors, the storage space provisioning system 300 monitors the data to be transferred from a primary storage server to a secondary storage server and automatically reserves a thin provisioned space in the secondary storage server before the data is transferred. Details of automatically reserving a thin provisioned space on a secondary storage server are discussed below.

Figure 2:
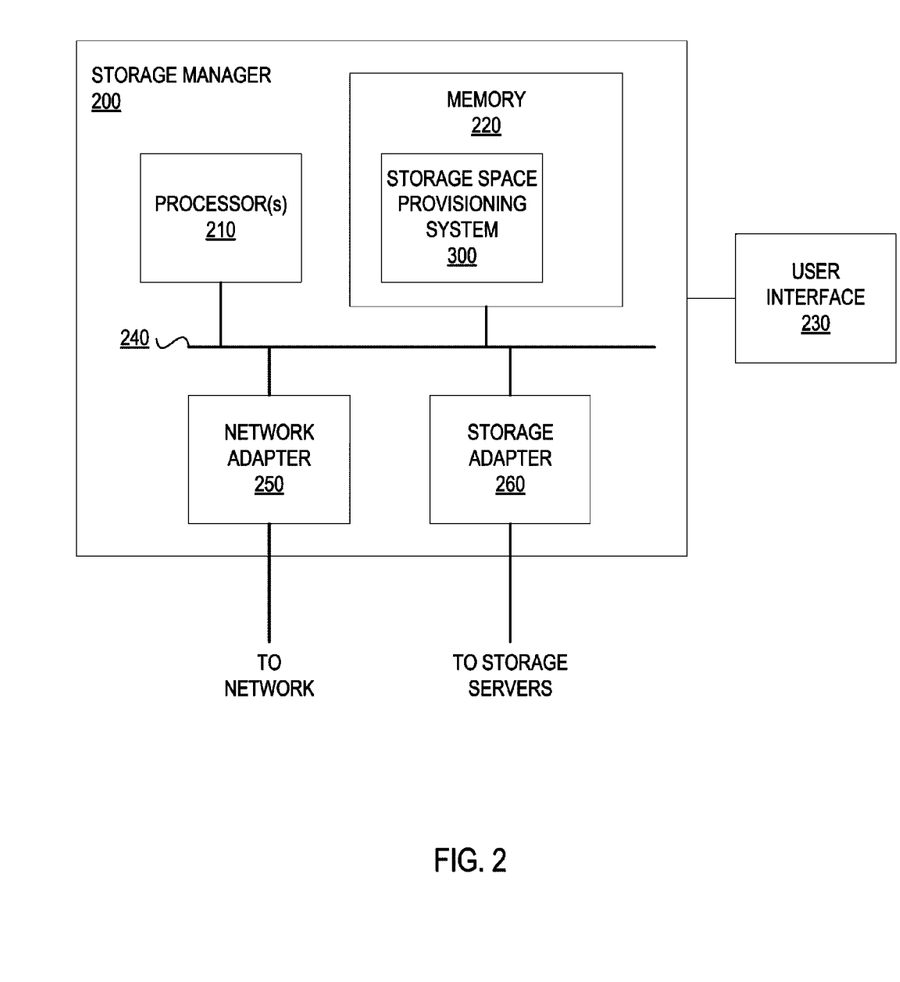
FIG. 2 illustrates an example of the hardware architecture for implementing a storage space provisioning system.

FIG. 2 is a high-level block diagram showing an example of the architecture for a storage manager 200 which implements a storage space provisioning system 300 for provisioning space on a secondary storage server in a network storage system. It will be appreciate that although storage manager 200 is shown in FIG. 1 as a physically separate system from storage servers 140, 150 and 160, in some embodiments, storage manager 200 may be implemented in the same processing environment of a storage server in the network. In other embodiments, storage manager 200 may be implemented in the same processing environment as client 110. Accordingly, the invention is not so limited to the embodiments described herein.

In FIG. 2, storage manager 200 includes one or more processors 210 and memory 220 connected via an interconnect 240. Interconnect 240 represents any one or more separate physical buses, point to point connections, or both connected by appropriate bridges, adapters, or controllers. Interconnect 240, therefore, may include, for example, a system bus, a Peripheral Component Interconnect (PCI) bus, a Hyper-Transport or industry standard architecture (ISA) bus, a small computer system interface (SCSI) bus, a universal serial bus (USB), IIC (I2C) bus, or an Institute of Electrical and Electronics Engineers (IEEE) standard 1394 bus, sometimes referred to as "Firewire."

Processor(s) 210 may include central processing units (CPUs) of storage manager 200 and thus controls the overall operations of storage manager 200. In certain embodiments, processor(s) 210 accomplish this by executing firmware or software stored in memory 220. Processor(s) 210 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 220 is or includes the main memory of storage manager 200. Memory 220 represents any form of random access memory (RAM), read-only memory (ROM), or the like. In use, memory 220 may contain a set of computer-executed instructions which, when executed by processor(s) 210, causes processor(s) 210 to perform operations to implement aspects of the present invention. In one embodiment, storage space provisioning system 300 resides in memory 220 to enable storage manager 200 to provision space on a secondary storage server as further discussed herein. Storage space provisioning system 300 may be implemented in computer-executable software, firmware, hardware or some combination thereof, and is discussed further in reference to FIG. 3.

Memory 220 also includes computer-executable instructions for implementing a protection policy on the network storage system, including instructions for directing a storage server to replicate data on another storage server. In one embodiment, referring to FIG. 1, instructions in memory 220 enables storage manager 200 to direct storage server 140 to establish a relationship with storage server 150 and backup data to storage server 150 via network 130.

Also connected to processor(s) 210 through interconnect 240 is a network adapter 250. Network adapter 250 provides storage manager 200 with the ability to communicate with remote devices, such as clients 110 over network 130 of FIG. 1, and may be, for example, an Ethernet adapter or Fibre Channel adapter. In one embodiment, network adapter 250 is connected to the network to process messages sent from storage servers 140 and 150 to storage manager 200.

In some embodiments, storage manager 200 is implemented in the same processing environment as a storage server (e.g. storage server 140, 150 or 160). In these cases, storage manager 200 also includes a storage adapter 260 connected to processor 210 via interconnection 240. Storage adapter 260 allows processor(s) 210 to access mass storage devices (e.g. storage units 170), and may be, for example, a Fibre Channel adapter or a SCSI adapter, for servicing client requests received via network adapter 250.

In certain embodiments, a user interface 230 is coupled to storage manager 200 for a storage administrator to interface with storage manager 200. User interface 230 may include command line interfaces or other means for receiving inputs from a storage administrator. In other embodiments, inputs from a storage administrator may be supplied to storage manager 200 by client 110 via network 130.

Figure 3:
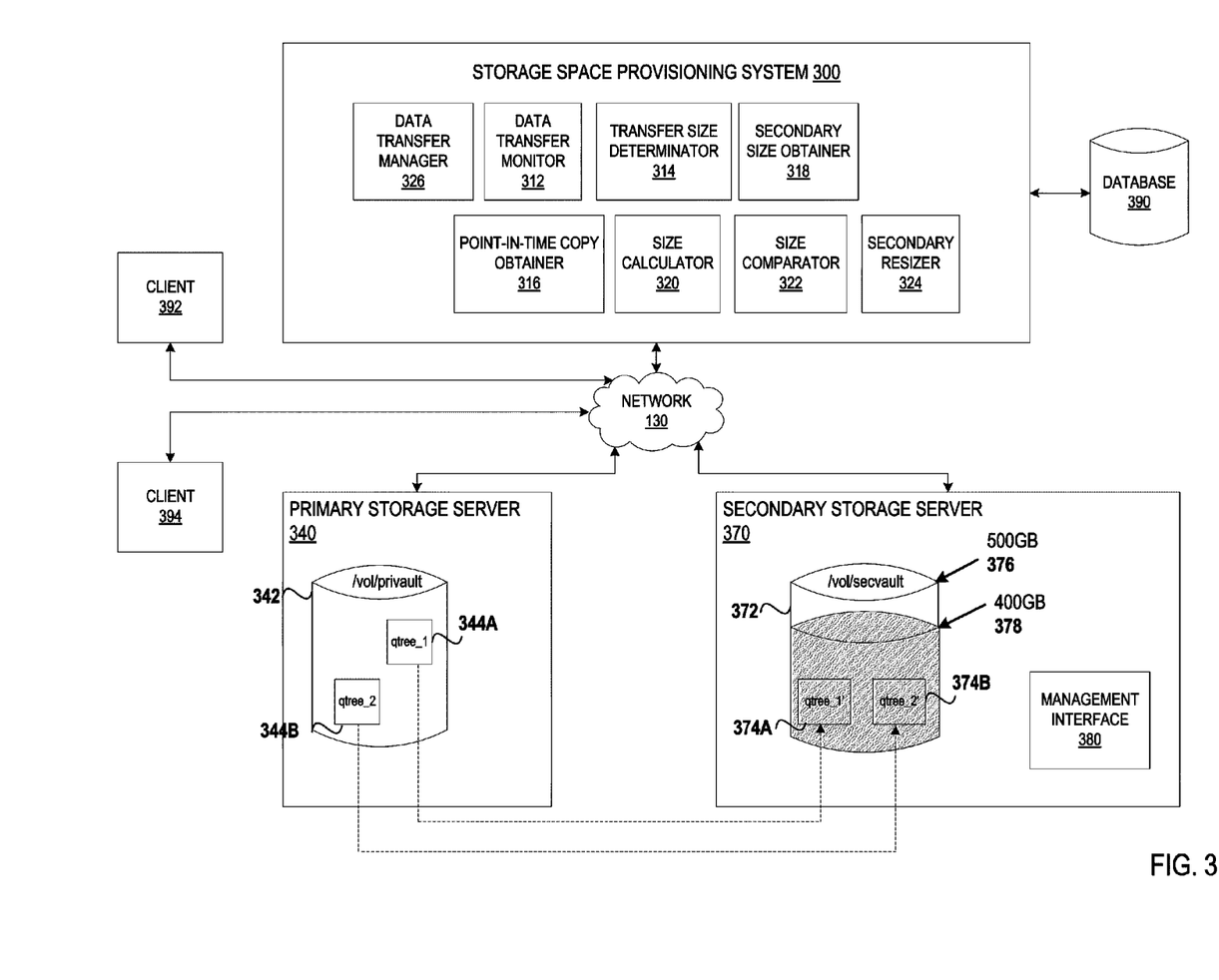
FIG. 3 illustrates an example of a provisioning architecture for reserving a thin provisioned space in a storage server.

Storage space provisioning system 300 for reserving a thin provisioned space in a secondary storage server is now discussed in accordance with one embodiment of the invention as shown in FIG. 3. Those skilled in the art will appreciate that thin provisioning is a way of presenting more storage space to the hosts or servers connecting to the storage system than is actually physically available. Storage space provisioning system 300 can be implemented by hardware (e.g., circuitry, dedicated logic, programmable logic, microcode, etc.), computer-implemented software (such as instructions run on a processing device), or a combination thereof. In one embodiment, the storage space provisioning system 300 can be located on storage manager 200 in FIG. 1. In another embodiment, one or more components of the storage space provisioning system 300 can be located on one or more storage servers, such as backup storage server 140 in FIG. 1.

Primary storage server 340 can have the data stored on its physical disks organized in logical storage containers called volumes and aggregates. An "aggregate" is a logical container for a pool of storage, combining one or more physical mass storage devices (e.g., disks) or parts thereof into a single logical storage object, which contains or provides storage for one or more other logical data sets (e.g., volumes) at a higher level of abstraction. A "volume" is a set of stored data associated with a collection of mass storage devices, such as disks, which obtains its storage from (i.e., is contained within) an aggregate, and which is managed as an independent administrative unit. A volume includes one or more file systems, such as an active file system and, optionally, one or more persistent point-in-time images ("point-in-time copies" or "snapshots") of the active file system captured at various instances in time. A "file system" is an independently managed, self-contained, hierarchal set of data units (e.g., files, blocks, or logical unit numbers (LUNs)). An "active file system" is a file system to which data can be both written and read or, more generally, responds to both read and write I/O operations. Although a volume or file system (as those terms are used herein) can store data in the form of files that is not necessarily the case. That is, a volume or file system can store data in the form of other units of data, such as blocks or LUNs. Logical volumes can be organized into smaller data management entities called "qtrees." A qtree is a subset of a volume used to allocate storage. A system administrator can set the size of a qtree and the size of the amount of data that can be stored in it, but the size of the qtree may not exceed the size of the volume that contain the qtree.

In this example, the primary storage server 340 has a single volume "/vol/privault" (also referred to as "primary volume" 342) that holds two qtrees, qtree_1 344A and qtree_2 344B. The client machines 392 and 394 can access data managed by the primary storage server 340 via network 130. Note that the data can be stored in storage containers of different forms and/or structures, such as qtrees, directories, volumes, etc. For example, the client machine 392 stores data in the qtree_1 344A, while the client machine 394 stores data in the qtree_2 344B. The primary storage server 340 can protect the data in qtree_1 344A and qtree_2 344B by backing up the data to the secondary storage server 370.

The secondary storage server 370 has a single volume "/vol/secvault" (also referred to as "secondary volume" 372). The secondary volume 372 can be a thin provisioned volume. Those skilled in the art will appreciate that thin provisioning is a way of presenting more storage space to the hosts or servers connecting to the storage system than is actually physically available. With thin provisioning a storage administrator can combine one or more disks (or parts thereof) and create volumes for different applications to use, but does not actually allocate any space upfront to those volumes. The space may be allocated when the host application needs it. The unused space is available for the existing thin provisioned volumes to expand or for use in creation of new volumes.

An example of thin provisioning is when a network storage subsystem (e.g., storage server) contains 5,000 GB of useable storage capacity but the storage administrator has mapped LUNs (logical unit number) of 500 GB each to 15 hosts. In this example, the storage administrator makes 7,500 GB of storage space visible to the hosts even though the storage system has only 5,000 GB of useable space. FIG. 3 illustrates the secondary volume 372 shows a 500 GB volume allocated with only 400 GB of actual data. In this example, the thin provisioned size 376 of the secondary volume 372 is 500 GB and the used sized 378 of the secondary volume 372 is 400 GB. The secondary storage server 370 can respectively store a backup copy of the data in qtree_1 344A and qtree_2 344B on the primary volume 342 in its secondary volume 372 in qtree_1$_{prime}$ 374A and in qtree_2$_{prime}$ 374B.

In the embodiment shown in FIG. 3, the storage space provisioning system 300 includes a data transfer manager 326, a data transfer monitor 312, a point-in-time copy obtainer 316, a transfer size determinator 314, a secondary size obtainer 318, a size calculator 320, a size comparator 322, a secondary resizer 324 and a database 390. This division of functionality is presented by way of example for sake of clarity. One skilled in the art would understand that the functionality described could be combined into a monolithic component or sub-divided into any combination of components.

Data transfer manager 326 can send a backup request to secondary storage server 370 to backup data stored on primary volume 342 on a primary storage server 340 to a secondary volume 372 on secondary storage server 370. The data transfer manager 326 can be implemented as hardware, computer-implemented software, firmware or a combination thereof. In one embodiment, the data transfer manager 326 comprises instructions stored in memory 220 executable by processor 210 in FIG. 2 for carrying out the functions of the data transfer manager 326.

Data transfer monitor 312 can detect data to be transferred (e.g., backed up) from a primary storage server 340 to a secondary storage server 370. For example, the data transfer monitor 312 can monitor for when the data transfer manager 326 sends a backup request to the secondary storage server 370 to back up data stored on the primary volume 342 to a secondary volume 372. The data transfer monitor 312 can be implemented as hardware, computer-implemented software, firmware or a combination thereof. In one embodiment, the data transfer monitor 312 comprises instructions stored in memory 220 executable by processor 210 in FIG. 2 for carrying out the functions of the data transfer monitor 312.

If data transfer monitor 312 detects data stored on the primary volume 340 is to be backed up to the secondary volume 372, a point-in-time copy obtainer 316 can obtain a point-in-time copy of the primary volume 342 from the primary storage server 340. The point-in-time copy obtainer 316 can be implemented as hardware, computer-implemented software, firmware or a combination thereof. In one embodiment, the point-in-time copy obtainer 316 comprises instructions stored in memory 220 executable by processor 210 in FIG. 2 for carrying out the functions of the point-in-time copy obtainer 316.

In one embodiment, when data on a primary volume on a primary storage server (e.g., primary storage server 140) is to be backed up to a secondary volume on a secondary storage server, the primary storage server generates a backup image that includes all point-in-time copies ("snapshots") of the active file system. In another embodiment, a storage server can automatically and periodically generate a point-in-time copy of the active file system. One embodiment of a snapshot of a volume will be described in greater detail in connection with FIGS. 5A-B and FIG. 6. In this example, the primary storage server 340 can generate a backup image having all point-in-time copies of the active file system. In one embodiment, the backup image includes a point-in-time copy of the active file system that is generated at the time the backup request is received. Point-in-time copy obtainer 316 can obtain the point-in-time copy generated by the primary storage server 340.

A transfer size determinator 314 uses the point-in-time copy to determine a maximum transfer size of the data to be transferred (e.g., backed up) from the primary volume 342 to the secondary volume 372. The determination of the maximum transfer size of the data to be transferred using the point-in-time copy is described in greater detail below in conjunction with FIG. 4. A determination of the maximum transfer size is made because the cost of determining the exact transfer size can be prohibitive. The transfer size determinator 314 can be implemented as hardware, computer-implemented software, firmware or a combination thereof. In one embodiment, the transfer size determinator 314 comprises instructions stored in memory 220 executable by processor 210 in FIG. 2 for carrying out the functions of the transfer size determinator 314. The point-in-time copy can be used to determine the maximum size of the data to be transferred (e.g., backed up).

A secondary size obtainer 318 obtains the thin provisioned size 376 of the secondary volume 372 and the used size 378 of the secondary volume 372. The secondary size obtainer 318 can be implemented as hardware, computer-implemented software, firmware or a combination thereof. In one embodiment, the secondary size obtainer 318 comprises instructions stored in memory 220 executable by processor 210 in FIG. 2 for carrying out the functions of the secondary size obtainer 318. The secondary size obtainer 318 can obtain the data from a management interface 380 on the secondary storage server 370. The management interface 380 can be implemented as hardware, computer-implemented software, firmware or a combination thereof. In one embodiment, the management interface 380 comprises instructions stored in memory (not shown) executable by processor (not shown) in backup storage server 140 in FIG. 1 for carrying out the functions of the management interface 380.

A size calculator 320 calculates the difference between the thin provisioned size 376 of the secondary volume 372 and the used size 378 of the secondary volume 372. The size calculator 320 can be implemented as hardware, computer-implemented software, firmware or a combination thereof. In one embodiment, the size calculator 320 comprises instructions stored in memory 220 executable by processor 210 in FIG. 2 for carrying out the functions of the size calculator 320. The storage space provisioner 125 can store the maximum transfer size, the thin provisioned size of the secondary volume, the used size of the secondary volume, and the difference calculated by the size calculator 320 in data structure such as a database 390, for example.

A size comparator 322 compares the maximum transfer size of the data to be transferred (e.g., backed up) to the difference between the thin provisioned size 376 of the secondary volume 372 and the used size 378 of the secondary volume 372 and determines whether the maximum transfer size is greater than the difference. The size comparator 322 can be implemented as hardware, computer-implemented software, firmware or a combination thereof. In one embodiment, the size comparator 322 comprises instructions stored in memory 220 executable by processor 210 in FIG. 2 for carrying out the functions of the size comparator 322.

A secondary resizer 324 causes the thin provisioned size 376 of the secondary volume 372 to be increased. The secondary resizer 324 can be implemented as hardware, computer-implemented software, firmware or a combination thereof. In one embodiment, the secondary resizer 324 comprises instructions stored in memory 220 executable by processor 210 in FIG. 2 for carrying out the functions of the secondary resizer 324. The secondary resizer 324 can send instructions to the management interface 380 on the secondary storage server 370 to increase the thin provisioned size 376 of the secondary volume 372. The secondary resizer 324 can request the size increase by calling an application programming interface (API) (not shown) on the secondary storage server 370. In one embodiment, the secondary resizer 324 can receive an acknowledgement from the management interface 380 that the thin provisioned size 376 of the secondary volume 372 has been increased and interface with the data transfer manager 326 to perform the data transfer.

Figure 4:
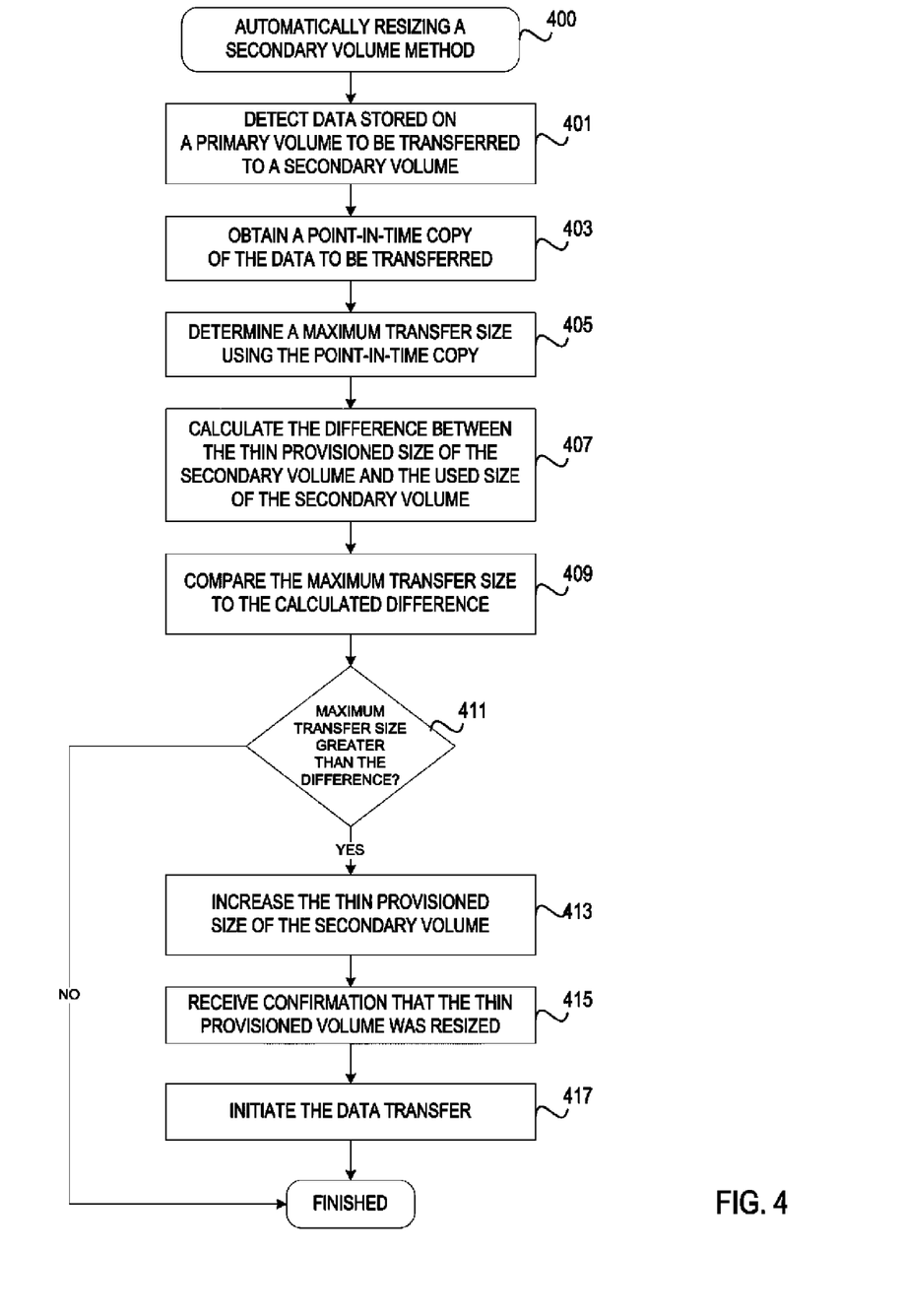
FIG. 4 illustrates a flowchart of a method to be performed by a storage space provisioning system according to an embodiment of the invention.

FIG. 4 illustrates a flowchart of an automatically resizing a secondary volume method 400 to be performed by a storage space provisioning system, such as storage space provisioning system 300, according to an embodiment of the invention. At block 401, the method detects that data stored on a primary volume on a primary storage server is to be transferred (e.g., backed up) to a secondary volume on secondary storage server. In one embodiment, the method 400 monitors for backup requests being sent to a secondary storage server to backup the data stored on a primary volume on a primary storage server to a secondary volume on the secondary storage server. In one embodiment, a storage manager sends a backup request to a secondary storage server and method 400 detects the backup request.

At block 403, the method obtains a point-in-time copy of the data to be transferred (e.g., backed up). The method 400 can obtain a backup image that includes all of the point-in-time copies ("snapshots") of a volume. In one embodiment, when data stored on a primary volume on a primary storage server is to be backed up to a secondary volume on a secondary server, the primary storage server generates a backup image that includes one or more point-in-time copies of the primary volume. In one embodiment, the method obtains a point-in-time copy of the data to be transferred from a primary storage server. In one embodiment, the image-based backup is a block-level incremental backup. A block-level incremental operation backs up only those blocks that have been changed since the last backup operation. Each block-level incremental operation generates a new backup image that includes only incremental snapshot(s). The backup image can store only the data blocks that have changed since an immediate-preceding snapshot.

At block 405, the method 400 uses the point-in-time copy ("snapshot") to determine the maximum size of the data on the primary volume to be transferred to the secondary volume. Typically, a storage system organizes logical volumes into smaller data management entities called "qtrees." A qtree is a special type of directory that acts as a "soft" partition, i.e., the storage used by the qtrees is not limited by physical space boundaries. For example, a storage system administrator may define backup relationships at the qtree level. However, a storage server, by default, does not track the size of the qtrees or how much data has changed in a qtree. It can be an expensive operation to determine how large a qtree is or how much of the data in a qtree has changed. However, certain features of the write-anywhere file layout system (such as the WAFL® file system as developed by NetApp, Inc. of Sunnyvale, Calif.), such as a snapshot operation, are logical volume attributes. Thus, when a storage server creates a snapshot, it creates a point-in-time copy of all qtrees in the volume, therefore enabling the size of a volume to be tracked.

Figure 5A:
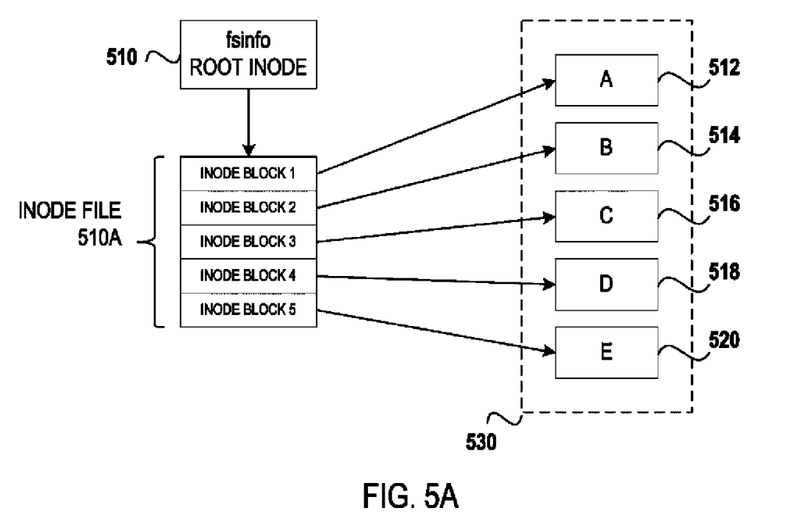
FIGS. 5A-5B are diagrams illustrating generation of a snapshot.

FIG. 5A is a simple diagram of a file system 530 before a snapshot is taken. The file system 530 is comprised of blocks 512-520. In the WAFL® file system, a file is represented in a data structure called an inode adapted for storage on disks. An inode stores basic information about a file, directory, or other file system object. An inode can identify the file and its attributes (e.g., file size, file owner, etc.). A first metadata file is the "inode file" 510A that contains data describing all other files in the file system. The inode file 510A is pointed to by an inode referred to as the "root inode" 510. The root inode 510 is kept in a location on disk referred to as the file system information (fsinfo) block. The blocks 512-520 represent all blocks in the file system 530. Though only five blocks 512-520 are shown, each block can point to other blocks or no blocks at all.

Figure 5B:
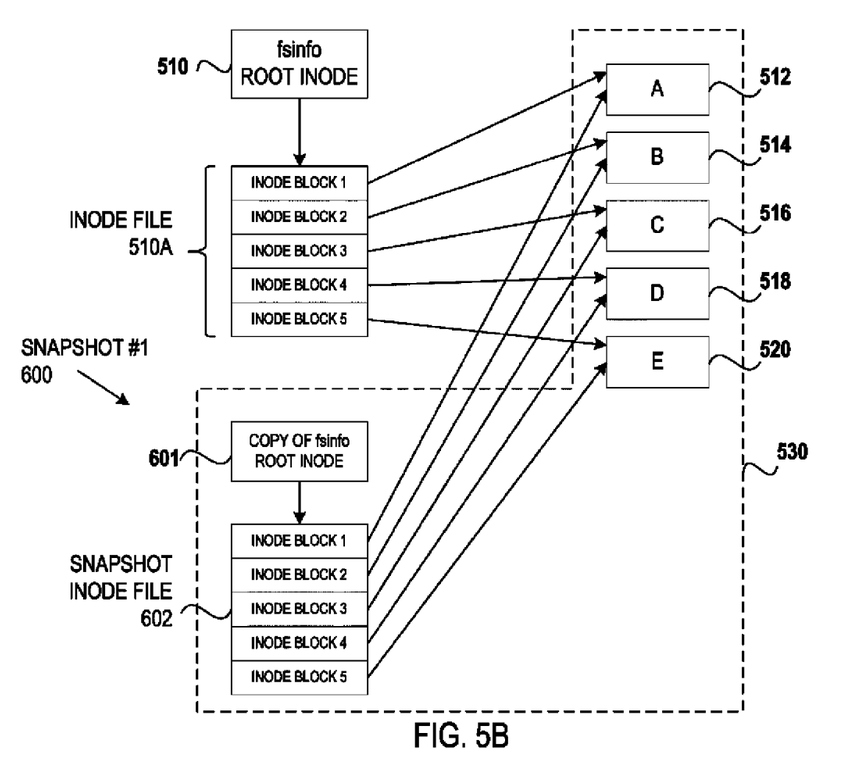

FIG. 5B is a diagram illustrating the creation of a snapshot. A snapshot 600 is a picture of a tree of blocks (512-520) that is the file system (file system 530 of FIG. 5A). The snapshot 600 is made for the entire file system 530 by simply copying the root inode 510 of the active file system 530 that is stored in fsinfo block into a snapshot inode 601 (root inode for the snapshot). The snapshot inode 601 is, in essence, a duplicate copy of the root inode 510 the file system 530. The new snapshot inode 601 points to a snapshot inode file 602 that points back to the highest level of indirection blocks 512-520.

Figure 6:
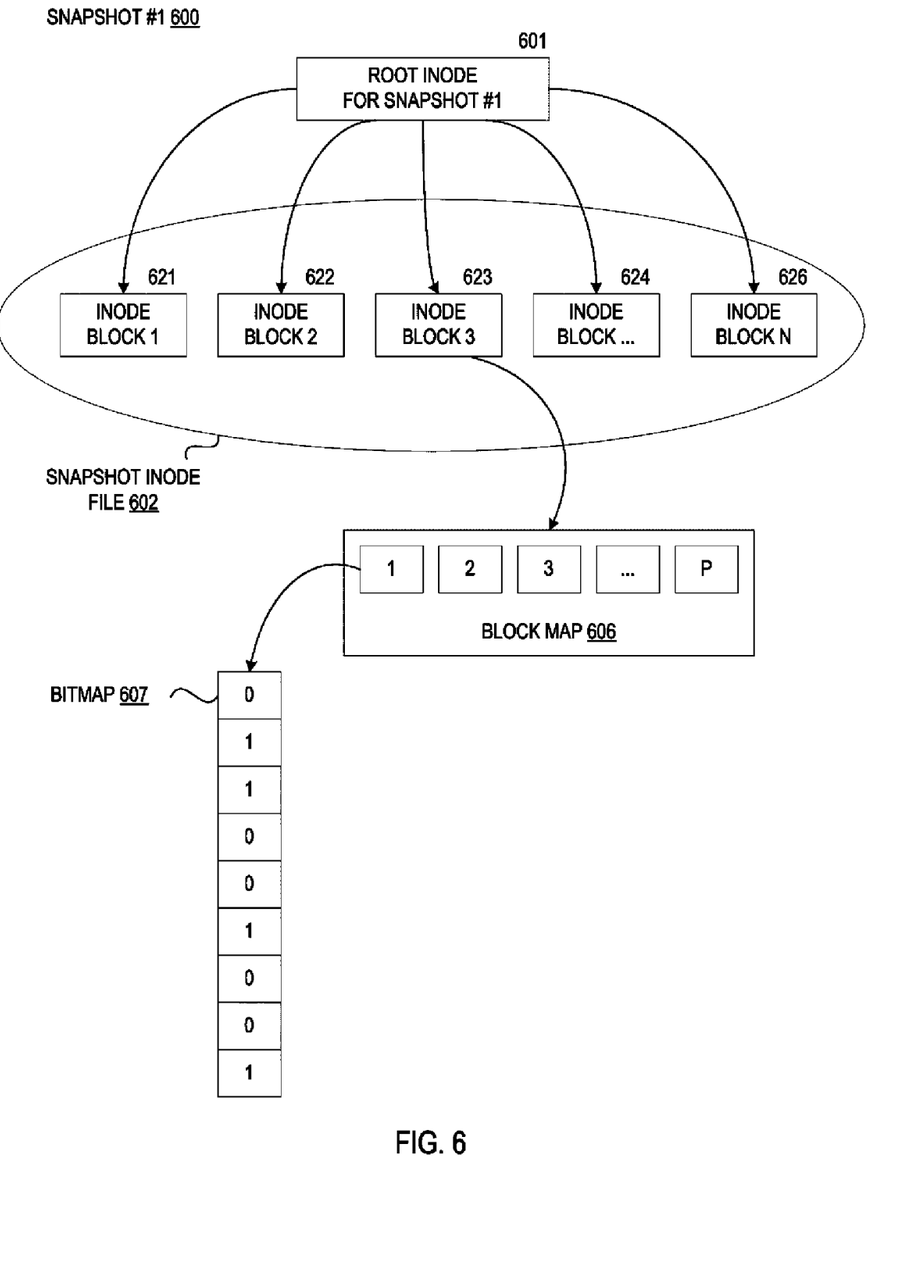
FIG. 6 is a block diagram of a snapshot.

FIG. 6 is a block diagram of a snapshot 600 having a corresponding block map 606 associated with the allocated and free blocks for the particular time the snapshot 600 was created. The root inode 601 for the snapshot 600 points to a snapshot inode file 602. Inode block 3 (623) points to a set of blocks (1, 2, 3, . . . , P) called a block map 606. Each block (1, 2, 3, . . . , P) in the block map 606 is a bitmap 607 where each bit corresponds to a block in the volume. A "1" in a particular position in the bitmap correlates with a particular allocated block in the active file system. Conversely, a "0" correlates to the particular block being unused by the active file system. Since each block (1, 2, 3, . . . , P) in the block map 606 can describe up to 32K blocks or 128 MB, 8 blocks are required per GB, 8K per TB.

Returning back to FIG. 4, the method 400 uses the size of the point-in-time copy ("snapshot") of the volume to determine the maximum transfer size (e.g., a maximum size of the data to be transferred). By copying the qtrees grouped in the same primary volume on a primary storage server into a single secondary volume on the secondary storage server (also known as volume affinity), the block map and bitmaps in the point-in-time copy of the primary volume can be used to identify the maximum transfer size of the data to be transferred to a secondary volume. A determination of the maximum transfer size is made because the cost of determining the exact transfer size can be prohibitive. For example, the method 400 can determine from block map and bitmaps of the snapshot that the size of the primary volume is 150 GB. Therefore, in this example, the maximum size of the data to be transferred to the secondary volume is 150 GB. The method 400 can store the maximum transfer size in a database, for example.

At block 407, the method calculates the difference between the thin provisioned size of the secondary volume and the used size of the secondary volume. The method 400 can obtain the thin provisioned size of the secondary volume and the used size of the secondary volume from the secondary storage server and calculate the difference. For example, a secondary volume is thin provisioned at 500 GB and its used size is 400 GB. In this example, the method 400 calculates the difference as 100 GB. The method 400 can store the thin provisioned size of the secondary volume, the used size of the secondary volume, and the difference in a database, for example.

At block 409, the method 400 compares the maximum transfer size to the difference between the thin provisioned size of the secondary volume and the used size of the secondary volume. By comparing the maximum transfer size to the difference, the method 400 determines whether the secondary volume has reserved sufficient thin provisioned free space to store the maximum amount of data that could be transferred. At block 411, the method 400 determines whether the maximum transfer size is greater than the difference. If the maximum transfer size is not greater than the difference, the secondary volume has reserved an adequate amount of thin provisioned free space to store the data that is to be transferred and the method 400 completes. Otherwise, if the maximum transfer size is greater than the difference, the method 400 continues to block 413 to increase the thin provisioned size of the secondary volume. The method 400 can send instructions to the secondary storage server to increase the thin provisioned size of the secondary volume. For example, a storage space provisioning system can request the size of the secondary volume to be increased by calling an API on the secondary storage server. In the above example, the maximum transfer size of 150 GB is greater than a difference of 100 GB, so the method 400 increases the thin provisioned size of the secondary volume. By increasing the thin provisioned size of the secondary volume, the method 400 ensures that the container within which the qtree lives has enough capacity to store the data to be transferred. The method 400 can increase the thin provisioned size of the secondary volume to be greater than the used size of the secondary volume plus the maximum transfer size. Using the above example, where the used size of the secondary volume is 400 GB and the maximum transfer size is 150 GB, the method 400 increases the thin provisioned size of the secondary volume from its current thin provisioned size of 500 GB to be greater than 550 GB.

In one embodiment, at block 415, the method 400 receives a notification confirming that the thin provisioned size of the secondary volume has been resized. At block 417, the method 400 initiates the data transfer (e.g., the data on the primary volume on the primary storage server can be backed up on the secondary volume on the secondary server).

In one embodiment not illustrated, the method 400 does not resize the secondary volume every time data is to be transferred from a primary volume to a secondary volume. The method 400 can resize the secondary volume periodically (e.g., every 10 or 15 times a data transfer is to occur). However, to ensure that the thin provisioned free space of the secondary volume is sufficient to accommodate transfers before the next periodic resizing, when the method 400 does resize a secondary volume, it can resize the thin provisioned size of the secondary volume to be an additional percentage of the used size of the secondary plus the maximum transfer size. The percentage value can be a pre-defined value or a user configurable value. The percentage value can be stored in a database. The method 400 can obtain the value from the database to resize the secondary volume. For example, the method 400 increases the thin provisioned size an additional 10 percent of the sum of the used size of the secondary and the maximum transfer size. Using the above example, the method 400 resizes the secondary volume an additional 55 GB (i.e., 10 percent of 550 GB) to 605 GB instead of 550 GB.

In practice, the method 400 can constitute one or more programs made up of computer-executable instructions. Describing the method with reference to the flowchart in FIG. 4 enables one skilled in the art to develop such programs, including such instructions to carry out the operations (acts) represented by logical blocks 401 until 415 on suitably configured computers (the processor of the computer executing the instructions from computer-readable media). The computer-executable instructions can be written in a computer programming language or can be embodied in firmware logic or in hardware circuitry. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages can be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or produce a result. It will be further appreciated that more or fewer processes may be incorporated into the method illustrated in FIG. 4 without departing from the scope of the invention and that no particular order is implied by the arrangement of blocks shown and described herein.

A storage manager comprising a provisioning architecture has been described. Although specific embodiments have been illustrated and described herein, it will be appreciated by those of ordinary skill in the art that any arrangement which is calculated to achieve the same purpose can be substituted for the specific embodiments shown. This application is intended to cover any adaptations or variations of the present invention.

Moreover, the description of FIG. 1 and FIG. 2 is intended to provide an overview of computer hardware and other operating components suitable for performing the methods of the invention described above, but is not intended to limit the applicable environments. One of skill in the art will immediately appreciate that the invention can be practiced with other computer system configurations. The invention can also be practiced in distributed computing environments where tasks are performed by remote processing devices that are linked through a communications network.

It will be readily apparent to one of skill, that input/output devices, such as a keyboard, a pointing device, and a display, can be coupled to the storage manager. These conventional features have not been illustrated for sake of clarity.

The term "memory" as used herein is intended to encompass all volatile storage media, such as dynamic random access memory (DRAM) and static RAM (SRAM). Computer-executable instructions can be stored on non-volatile storage devices, such as magnetic hard disk, an optical disk, and are typically written, by a direct memory access process, into memory during execution of software by a processor. One of skill in the art will immediately recognize that the term "computer-readable storage medium" includes any type of volatile or non-volatile storage device that is accessible by a processor.

Therefore, it is manifestly intended that this invention be limited only by the following claims and equivalents thereof.

What is claimed is:

1. A method comprising:
   detecting, by a storage space provisioning system, data stored on a primary volume that is to be transferred to a secondary volume, wherein the secondary volume has a thin provisioned size;
   obtaining a point-in-time copy of the data stored on the primary volume that is to be transferred;
   determining a maximum transfer size of the data to be transferred from the point-in-time copy;
   comparing the maximum transfer size to a difference between the thin provisioned size of the secondary volume and a used size of the secondary volume; and
   increasing the thin provisioned size of the secondary volume to be greater than the used size of the secondary volume plus the maximum transfer size when the maximum transfer size is greater than the difference.

2. The method of claim 1, wherein detecting data stored on a primary volume that is to be transferred to a secondary volume comprises:

monitoring for a request to backup data stored on the primary volume to the secondary volume.

3. The method of claim 1, wherein increasing the thin provisioned size of the secondary volume comprises:
sending instructions to a storage server to increase the thin provisioned size of the secondary volume.

4. The method of claim 1, further comprising initiating the data transfer of the data stored on the primary volume to the secondary volume.

5. The method of claim 4, wherein initiating the data transfer comprises receiving a confirmation that the thin provisioned size of the secondary volume was increased.

6. The method of claim 1, wherein increasing the thin provisioned size comprises resizing the thin provisioned size of the secondary volume to be an additional percentage of a sum of the used size of the secondary volume and the maximum transfer size.

7. The method of claim 1, wherein comparing the maximum transfer size to the difference between the thin provisioned size of the secondary volume and the used size of the secondary volume comprises:
obtaining the thin provisioned size of the secondary volume;
obtaining the used size of the secondary volume; and
calculating the difference between the thin provisioned size of the secondary volume and the used size of the secondary volume.

8. The method of claim 1, wherein obtaining a point-in-time copy of the data stored on the primary volume that is to be transferred comprises obtaining a point-in-time copy from a primary storage server.

9. A data storage system comprising:
a primary storage server to store data on a primary volume on the primary storage server, wherein the data is to be transferred to a secondary storage server;
a secondary storage server having a secondary volume to store data transferred from the primary volume on the primary storage server to the secondary volume on the secondary storage server, wherein the secondary volume has a thin provisioned size;
a computer comprising a storage space provisioner logically coupled to the primary storage server and the secondary storage server, wherein the storage space provisioner comprises:
a data transfer monitor to detect the data stored on the primary volume that is to be transferred to the secondary volume;
a point-in-time copy obtainer to obtain a point-in-time copy of the data to be transferred;
a transfer size determinator to determine a maximum transfer size of the data to be transferred using the point-in-time copy;
a size comparator to compare the maximum transfer size to a difference between the thin provisioned size of the secondary volume and a used size of the secondary volume; and
a secondary resizer to increase the thin provisioned size of the secondary volume to be greater than the used size of the secondary volume plus the maximum transfer size; and
a database to store the thin provisioned size of the secondary volume, the used size of the secondary volume, the difference between the thin provisioned size of the secondary volume and the used size of the secondary volume, and the maximum transfer size.

10. The data storage system of claim 9, wherein the secondary resizer is to increase the thin provisioned size of the secondary volume by sending instructions to the secondary storage server to increase the thin provisioned size of the secondary volume.

11. The data storage system of claim 9, wherein the secondary resizer is further to initiate the data transfer of the data stored on a primary volume to the secondary volume.

12. The data storage system of claim 11, wherein the secondary resizer is further to receive a confirmation that the thin provisioned size of the secondary volume was increased.

13. The data storage system of claim 9, wherein to increase the thin provisioned size of the secondary volume comprises resizing the thin provisioned size of the secondary volume to be an additional percentage of a sum of the used size of the secondary volume and the maximum transfer size.

14. The data storage system of claim 9, wherein the storage space provisioner further comprises:
a secondary size obtainer to determine the thin provisioned size of the secondary volume and the used size of the secondary volume; and
a size calculator to calculate the difference between the thin provisioned size of the secondary volume and the used size of the secondary volume.

15. A computer system comprising:
a processor coupled to a memory through a bus; and
instructions executed from the memory by the processor to cause the processor
to detect data stored on a primary volume that is to be transferred to a secondary volume, wherein the secondary volume has a thin provisioned size,
to obtain a point-in-time copy of the data stored on the primary volume that is to be transferred,
to determine a maximum transfer size of the data to be transferred using the point-in-time copy,
to compare the maximum transfer size to a difference between the thin provisioned size of the secondary volume and a used size of the secondary volume, and
to increase the thin provisioned size of the secondary volume to be greater than the used size of the secondary volume plus the maximum transfer size when the maximum transfer size is greater than the difference.

16. The system of claim 15, wherein to increase the thin provisioned size of the secondary volume comprises sending instructions to a storage server to increase the thin provisioned size of the secondary volume.

17. The system of claim 15, wherein the processor is further to initiate the data transfer of the data stored on a primary volume to the secondary volume.

18. The system of claim 17, wherein the processor is further to receive a confirmation that the thin provisioned size of the secondary volume was increased.

19. The system of claim 15, wherein to increase the thin provisioned size of the secondary volume comprises resizing the thin provisioned size of the secondary volume to be an additional percentage of a sum of the used size of the secondary volume and the maximum transfer size.

20. The system of claim 15, wherein to compare the maximum transfer size to a difference between the thin provisioned size of the secondary volume and a used size of the secondary volume comprises:
obtaining the thin provisioned size of the secondary volume;
obtaining the used size of the secondary volume; and
calculating the difference between the thin provisioned size of the secondary volume and the used size of the secondary volume.

21. A method comprising:
  detecting by a storage provisioning system data stored on a primary volume that is to be transferred to a secondary volume, wherein the secondary volume has a thin provisioned size and a used size;
  comparing by the storage provisioning system a difference between the thin provisioned size of the secondary volume and the used size of the secondary volume to a maximum transfer size of the data to be transferred, wherein the maximum transfer size is determined from a point-in-time copy of the data to be transferred; and
  increasing by the storage provisioning system the thin provisioned size of the secondary volume to be greater than the used size of the secondary volume plus the maximum transfer size if the maximum transfer size is greater than the difference.

* * * * *